United States Patent
Cho et al.

(10) Patent No.: US 8,107,356 B2
(45) Date of Patent: Jan. 31, 2012

(54) METHOD AND APPARATUS FOR TRANSMITTING/RECEIVING A SIGNAL IN AN FFH-OFDM COMMUNICATION SYSTEM

(75) Inventors: Yun-Ok Cho, Suwon-si (KR); Young-Kyun Kim, Seongnam-si (KR); Joon-Young Cho, Suwon-si (JP); Ju-Ho Lee, Suwon-si (KR); Peter Jung, Duisburg (DE); Tobias Scholand, Duisburg (DE); Guido Bruck, Duisburg (DE); Thomas Faber, Duisburg (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 1087 days.

(21) Appl. No.: 11/317,239

(22) Filed: Dec. 27, 2005

(65) Prior Publication Data
US 2006/0268675 A1 Nov. 30, 2006

(30) Foreign Application Priority Data

Dec. 27, 2004 (KR) .................. 10-2004-0112962
Apr. 8, 2005 (KR) .................. 10-2005-0029629

(51) Int. Cl.
*H04J 11/00* (2006.01)
(52) U.S. Cl. ........ 370/210; 370/203; 370/208; 370/335; 370/342; 375/260; 375/350; 375/231; 714/792
(58) Field of Classification Search ................ 370/203, 370/208, 335, 342, 210; 375/260, 350, 231; 714/792
See application file for complete search history.

(56) References Cited

U.S. PATENT DOCUMENTS 7,035,310 B1 * 4/2006 Roberts ..................... 375/132
(Continued)

FOREIGN PATENT DOCUMENTS
JP 2001-156739 6/2001
(Continued)

OTHER PUBLICATIONS

Hamaguchi, K; Hanzo, L; "Time-Frequency spread OFDM/FHMA" Vehicular Technology Conference, 2003. VTC 2003-Spring. The 57th IEEE Semiannual vol. 2, Apr. 22-25, 2003 pp. 1248-1252; vol. 2.
(Continued)

*Primary Examiner* — Dwayne Bost
*Assistant Examiner* — Amancio Gonzalez
(74) *Attorney, Agent, or Firm* — Roylance, Abrams, Berdo & Goodman, L.L.P

(57) ABSTRACT

Provided is an apparatus for signal transmission in a Fast Frequency Hopping-Orthogonal Frequency Division Multiplexing (FFH-OFDM) communication system which divides all of the available frequency bands into a plurality of sub-carrier bands and includes a plurality of sub-channels each including at least one sub-carrier band. The apparatus includes: a Fast Frequency Hopping (FFH) unit for allocating input data to a number of selected sub-carriers from among the plurality of sub-carriers and for performing fast frequency hopping in accordance with a fast frequency hopping pattern to generate FFH signals, wherein one or more pieces of data comprise the input data and each of the one or more pieces of data is allocated to one of the selected sub-carriers; a Fast Fourier Transform (FFT) unit for performing FFT on FFH signals; a controller for inserting null data into remaining sub-carriers, the remaining sub-carriers comprising sub-carriers other than the selected sub-carriers; a first Inverse Fast Fourier Transform (IFFT) unit for performing IFFT on both the selected sub-carriers comprising the input data and the remaining sub-carriers comprising the inserted null data to generate first IFFT signals; and a transmitter for transmitting the first IFFT signals.

8 Claims, 7 Drawing Sheets

U.S. PATENT DOCUMENTS

| | | | |
|---|---|---|---|
| 2002/0138807 A1* | 9/2002 | Nguyen | 714/792 |
| 2003/0035491 A1* | 2/2003 | Walton et al. | 375/267 |
| 2004/0114691 A1* | 6/2004 | Kim | 375/260 |
| 2004/0120409 A1* | 6/2004 | Yasotharan et al. | 375/260 |
| 2004/0228267 A1* | 11/2004 | Agrawal et al. | 370/203 |
| 2006/0072649 A1* | 4/2006 | Chang et al. | 375/132 |

FOREIGN PATENT DOCUMENTS

| | | |
|---|---|---|
| JP | 2002-135230 | 5/2002 |
| JP | 2004-320679 | 11/2004 |
| JP | 2005-304040 | 10/2005 |
| JP | 2005-304041 | 10/2005 |
| JP | 2006-054542 | 2/2006 |
| JP | 2006-504324 | 2/2006 |
| JP | 2007-527181 | 9/2007 |
| JP | 2007-533199 | 11/2007 |
| JP | 2008-511208 | 4/2008 |
| KR | 10-2004-00580 45 | 7/2004 |
| WO | WO 2004/038972 A1 | 5/2004 |

OTHER PUBLICATIONS

Massimiliano Pompili, Sergio Barbarossa, Georgios B. Giannakis, "Channel-Independent Non-Data Aided Synchronization of Generalized Multiuser OFDM" ICASSP 2001.

A.H. Tewfik, E. Saberinia, University of Minnesota "Fast Frequency HoppingUWB-OFDM", IEEE 802.15 <03147r3>, May 10, 2003.

* cited by examiner

METHOD AND APPARATUS FOR TRANSMITTING/RECEIVING A SIGNAL IN AN FFH-OFDM COMMUNICATION SYSTEM

PRIORITY CROSS-REFERENCE TO RELATED PATENT APPLICATIONS

This application claims the benefit under 35 U.S.C. §119(a) of Korean Patent Application No. 2004-112962, filed on Dec. 27, 2004, and Korean Patent Application No. 2005-29629, filed on Apr. 8, 2005, the entire contents of both of which are hereby incorporated by reference.

BACKGROUND OF THE INVENTION

1. Field of the Invention

The present invention relates to a communication system (FFH-OFDM communication system) using a Fast Frequency Hopping (FFH) scheme and an Orthogonal Frequency Division Multiplexing (OFDM) scheme. More particularly, the present invention relates to a method and an apparatus for transmitting/receiving signals by using only a subset of all of the available frequency bands used in an FFH-OFDM communication system.

2. Description of the Related Art

In a 4$^{th}$ generation (4G) communication system, research has been actively pursued to provide users with services having various qualities of service (QoS) and supporting a high transmission speed. Additionally, research has been actively pursued to develop a new communication system capable of supporting high speed services, and ensuring mobility and QoS in a wireless local area network (LAN) and a metropolitan area network (MAN) system.

In order to support a broadband transmission network for a physical channel of the wireless MAN system, the OFDM scheme and an Orthogonal Frequency Division Multiple Access (OFDMA) scheme are being widely utilized. The OFDM/OFDMA scheme can achieve high speed data transmission by using a plurality of sub-carriers when transmitting physical channel signals, and can acquire a frequency diversity gain by using different sub-carrier bands for frequency bands for signal transmission.

In comparison to a system using a single sub-carrier, the OFDM communication system which uses a plurality of sub-carriers has a symbol period that is prolonged in proportion to the number of sub-carriers with respect to transmission speed for the same data. By using a guard interval, the OFDM communication system can reduce the Inter-Symbol Interference (ISI) in a wireless channel having multipath fading. Methods for inserting the guard interval include a cyclic prefix method and a cyclic postfix method. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol.

Further, a channel response of each sub-carrier band is approximated to be flat in the sub-carrier band. Also, by setting the difference Δf between sub-carrier frequencies to be an inverse multiple the sampling period T, (Δf=1/T$_s$), it is possible to reduce the Inter-Carrier Interference (ICI) during one OFDM symbol period. When the sub-carriers are orthogonal to each other and there is no interference between them. The receiver of the OFDM communication system can demodulate data by using a single tap equalizer which has a relatively simple structure. Further, the OFDM communication system can minimize the complexity of the system, since the OFDM communication system uses an Inverse Fast Fourier Transform (IFFT) scheme and a Fast Fourier Transform (FFT) scheme in order to modulate/demodulate the plurality of sub-carriers. An operation of an Inverse Fast Fourier Transform unit (IFFT unit) using the IFFT scheme corresponds to a frequency modulation operation in the OFDM communication system, which can be expressed by a matrix $\underline{D}_Q$ as defined by equation (1) below.

$$[D_Q]_{n,m} = \frac{1}{\sqrt{Q}}\left[\exp\left\{j2\pi(n-1)\cdot\frac{(m-1)}{Q}\right\}\right], \quad (1)$$

$$m, n = 1, \ldots, Q$$

In equation (1), Q denotes the number of all sub-carriers used in the OFDM communication system, n denotes a sample index, and m denotes a sub-channel index. $\underline{D}_Q$ denotes an IFFT matrix having a size of Q×Q. The sub-channel refers to a channel including at least one sub-carrier. Further, an operation of a Fast Fourier Transform (FFT) unit using the FFT scheme can be expressed by a Hermitian $\underline{D}_Q^H$ of the IFFT matrix $\underline{D}_Q$ as defined by equation (1).

Meanwhile, when the plurality of sub-carriers in the OFDM communication system include sub-carriers which undergo deep fading, there is a low probability that data transmitted by the sub-carriers undergoing the deep fading can be successfully decoded by the receiver. Schemes proposed in order to overcome performance degradation due to the deep fading include a frequency hopping scheme and a Forward Error Correction (FEC) scheme.

The frequency hopping scheme is a scheme in which the frequency band for signal transmission is changed according to a predetermined frequency hopping pattern, so that it is possible to obtain an average gain of the Inter-Cell Interference (ICI). In other words, according to the frequency hopping scheme, signals are transmitted while transmission frequency bands for sub-carriers are periodically changed according to the predetermined frequency hopping pattern. Therefore, the frequency hopping scheme can prevent signals from being continuously transmitted to a single user by the sub-carriers undergoing the deep fading due to the frequency selective channel characteristic. The frequency hopping period is a time interval corresponding to an integer number of times of the OFDM symbol time or OFDM symbol. As a result, in the case of using the frequency hopping scheme, even when signals are transmitted by sub-carriers undergoing the deep fading at a predetermined OFDM symbol time, it is possible to transmit the signals by sub-carriers which do not undergo the deep fading at a next OFDM symbol time, thereby preventing the signal transmission from being continuously influenced by the deep fading, so that it is possible to average the frequency diversity gain and interference.

Further, according to an FH-OFDM scheme which is a combination of the frequency hopping scheme and the OFDM scheme, different sub-channels are allocated to users, and the sub-channels allocated to the users are subjected to frequency hopping. This makes it possible to obtain the frequency diversity gain and ICI average gain.

However, in order to have a sufficient gain by the frequency hopping scheme, the conventional OFDM communication system must perform the frequency hopping during many OFDM symbol time periods. Further, it requires a large number of users, and must select a proper frequency hopping pattern according to the channels. Even further, in the conventional OFDM communication system using the frequency hopping scheme, although signals are not continuously transmitted to a single user by the sub-carriers undergoing the deep fading, it is still impossible for a receiver to demodulate the signals transmitted by the sub-carriers undergoing the deep fading at every OFDM symbol time period.

Accordingly, there is a need for an improved method and an apparatus for transmitting/receiving signals by using only a subset of all of the available frequency bands used in an FFH-OFDM communication system so as to enable a receiver to demodulate signals transmitted by the sub-carriers undergoing deep fading.

SUMMARY OF THE INVENTION

An aspect of the present invention is to address at least the above problems and/or disadvantages and to provide at least the advantages described below. Accordingly, an aspect of an exemplary embodiment of the present invention is to provide a method and an apparatus for transmitting/receiving a signal in an FFH-OFDM communication system.

It is, another object of an exemplary embodiment of the present invention to provide a method and an apparatus for transmitting/receiving a signal by using only a subset of all of the available frequency bands used in an FFH-OFDM communication system.

In order to accomplish this object, there is provided an apparatus for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the apparatus including: a Fast Frequency Hopping (FFH) unit for allocating input data to a number of selected sub-carriers from among the plurality of sub-carriers and for performing fast frequency hopping in accordance with a fast frequency hopping pattern to generate FFH signals, wherein one or more pieces of data comprise the input data and each of the one or more pieces of data is allocated to one of the selected sub-carriers; a Fast Fourier Transform (FFT) unit for performing FFT on FFH signals; a controller for inserting null data into remaining sub-carriers, the remaining sub-carriers comprising sub-carriers other than the selected sub-carriers; a first Inverse Fast Fourier Transform (IFFT) unit for performing IFFT on both the selected sub-carriers comprising the input data and the remaining sub-carriers comprising the inserted null data to generate first IFFT signals; and a transmitter for transmitting the first IFFT signals.

In accordance with another aspect of an exemplary embodiment of the present invention, there is provided a method for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the method including the steps of: allocating input data to a number of selected sub-carriers from among the plurality of sub-carriers and performing Fast Frequency Hopping (FFH) in accordance with a fast frequency hopping pattern to generate FFH signals, wherein one or more pieces of data comprise the input data and each of the one or more pieces of data is allocated to one of the selected sub-carriers; performing Fast Fourier Transform (FFT) on the FFH signals; inserting null data into remaining sub-carriers, the remaining sub-carriers comprising sub-carriers other than the selected sub-carriers; performing Inverse Fast Fourier Transform (IFFT) on both the selected sub-carriers comprising the input data and the remaining sub-carriers comprising the inserted null data to generate first IFFT signals; and transmitting the converted signals having been subjected to the IFFT by the IFFT unit.

In accordance with another aspect of an exemplary embodiment of the present invention, there is provided an apparatus for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the apparatus including: a first Fast Fourier Transform (FFT) unit for performing FFT on received signals; a controller for separating remaining sub-carriers, the remaining sub-carriers comprising sub-carriers other than a number of selected sub-carriers, through which a transmitting apparatus transmits data, from the signals FFTed in the first FFT unit, and then inserting null data into the remaining sub-carriers; a first equalizer for equalizing output signals of the controller in a frequency domain; an Inverse Fast Fourier Transform (IFFT) unit for performing IFFT on the signals equalized by the first equalizer in accordance with a fast frequency hoping matrix applied by the transmitting apparatus; a second equalizer for equalizing the IFFTed signals in a time domain; and a second Fast Fourier Transform (IFFT) unit for performing FFT on the signals equalized in the time domain.

In accordance with another aspect of an exemplary embodiment of the present invention, there is provided a method for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the method including the steps of: (1) performing Fast Fourier Transform (FFT) on received signals; (2) separating remaining sub-carriers, the remaining sub-carriers comprising sub-carriers other than a number of selected sub-carriers, through which a transmitting apparatus transmits data, from the signals FFTed in the first FFT unit, and then inserting null data into the remaining sub-carriers; (3) equalizing signals generated in step (2) in a frequency domain; (4) performing Inverse Fast Fourier Transform (IFFT) on the signals equalized in the frequency domain in accordance with a fast frequency hoping matrix; (5) equalizing the IFFTed signals in a time domain; and (6) performing Fast Fourier Transform (IFFT) on the signals equalized in the time domain.

In accordance with another aspect of an exemplary embodiment of the present invention, there is provided an apparatus for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the apparatus including: a first controller for inserting null data into remaining sub-carriers, the remaining sub-carriers comprising sub-carriers other than a number of selected sub-carriers, through which input data is carried, from among all of the available sub-carriers; a Fast Frequency Hopping (FFH) unit for allocating the input data to the number of selected sub-carriers, and for performing fast frequency hopping in accordance with a fast frequency hopping pattern to generate FFH signals, wherein one or more pieces of data comprise the input data and each of the one or more pieces of data is allocated to one of the selected sub-carriers; a Fast Fourier Transform (FFT) unit for performing FFT on the FFH; a second controller for inserting null data into the remaining sub-carriers; a first Inverse Fast Fourier Transform (IFFT) unit for performing IFFT on both the selected sub-carriers comprising the input data and the remaining sub-carriers comprising the inserted null data to generate first IFFT signals; and a transmitter for transmitting the first IFFT signals.

In accordance with another aspect of an exemplary embodiment of the present invention, there is provided a method for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the method including: (1) inserting null data into remaining sub-carriers, the remaining sub-carriers comprising sub-carriers other than a number of selected sub-carriers, through which input data is carried, from among all of the available sub-carriers; (2) allocating the input data to the number of selected sub-carriers, and then performing fast frequency hopping in accordance with a fast frequency hopping pattern to generate FFH signals, wherein one or more pieces of data comprise the input data and each of the one or more pieces of data is allocated to one of the selected sub-carriers; (3) performing Fast Fourier Transform (FFT) on the FFH; (4) inserting null data into the remaining sub-carriers; (5) performing Inverse Fast Fourier Transform on both the selected sub-carriers comprising the input data and the remaining sub-carriers comprising the inserted null data to generate first IFFT signals in step (4); and (6) transmitting the first IFFT signals.

In accordance with another aspect of an exemplary embodiment of the present invention, there is provided an apparatus for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the apparatus including: a first Fast Fourier Transform (FFT) unit for performing FFT on received signals; a first controller for separating remaining sub-carriers, the remaining sub-carriers comprising sub-carriers other than a number of selected sub-carriers, through which a transmitting apparatus transmits data, from the signals FFTed in the first FFT unit, and then inserting null data into the remaining sub-carriers; a first equalizer for equalizing output signals of the controller in a frequency domain; an Inverse Fast Fourier Transform (IFFT) unit for performing IFFT on the signals equalized by the first equalizer in accordance with a fast frequency hoping matrix applied by the transmitting apparatus; a second equalizer for equalizing the IFFTed signals in a time domain; a second Fast Fourier Transform (IFFT) unit for performing FFT on the signals equalized in the time domain; and a second controller for separating the remaining sub-carriers from the signals FFTed in the second FFT unit, and then inserting null data into the remaining sub-carriers.

In accordance with another aspect of an exemplary embodiment of the present invention, there is provided a method for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the method including the steps of: (1) performing Fast Fourier Transform (FFT) on received signals; (2) separating remaining sub-carriers, the remaining sub-carriers comprising sub-carriers other than a number of selected sub-carriers, through which a transmitting method transmits data, from the signals FFTed in the first FFT unit, and then inserting null data into the remaining sub-carriers; (3) equalizing signals generated in step (2); (4) performing Inverse Fast Fourier Transform (IFFT) on the signals equalized in the frequency domain in accordance with a fast frequency hoping matrix; (5) equalizing the IFFTed signals in a time domain; (6) performing Fast Fourier Transform (IFFT) on the signals equalized in the time domain; and (7) separating the remaining sub-carriers from the signals FFTed in the second FFT unit and then inserting null data into the remaining sub-carriers.

In accordance with another aspect of an exemplary embodiment of the present invention, there is provided an apparatus for signal transmission in a Fast Frequency Hopping-Orthogonal Frequency Division Multiplexing (FFH-OFDM) communication system which divides all of the available frequency bands into a plurality of sub-carrier bands and comprises a plurality of sub-channels each comprising at least one sub-carrier band, the apparatus including: a Fast Frequency Hopping-OFDM (FFH-OFDM) processing unit for performing fast frequency hopping for signals to be transmitted by each user and converting the signals into OFDM signals, the FFH-OFDM processing unit including a plurality of processors, each of which allocates input data to a number of selected sub-carriers from among the plurality of sub-carriers and for performing fast frequency hopping in accordance with a fast frequency hopping pattern to generate FFH-OFDM signals, wherein one or more pieces of data comprise the input data and each of the one or more pieces of data is allocated to one of the selected sub-carriers; a multiplexer for multiplexing the FFH-OFDM signals; an Inverse Fast Fourier Transform (IFFT) unit for performing IFFT on the multiplexed signals; and a transmitter for transmitting the IFFTed signals.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF THE PREFERRED EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention include a method and an apparatus for transmitting/receiving a signal while performing fast frequency hopping by using only a subset of all of the available frequency bands used in a communication system (FFH-OFDM communication system) using a Fast Frequency Hopping (FFH) scheme and an Orthogonal Frequency Division Multiplexing (OFDM) scheme. The FFH hopping scheme is a scheme in which fast frequency hopping is performed in a period of an OFDM sample, or an integer number of times of the OFDM sample instead of the OFDM symbol period. Therefore, according to the FFH hopping scheme, one OFDM symbol is transmitted after being spread to a plurality of sub-carriers in the frequency domain.

A structure of a transmitter which performs fast frequency hopping by using all of the available frequency bands in an FFH-OFDM communication system will be described with reference to FIG. 1.

Figure 1:
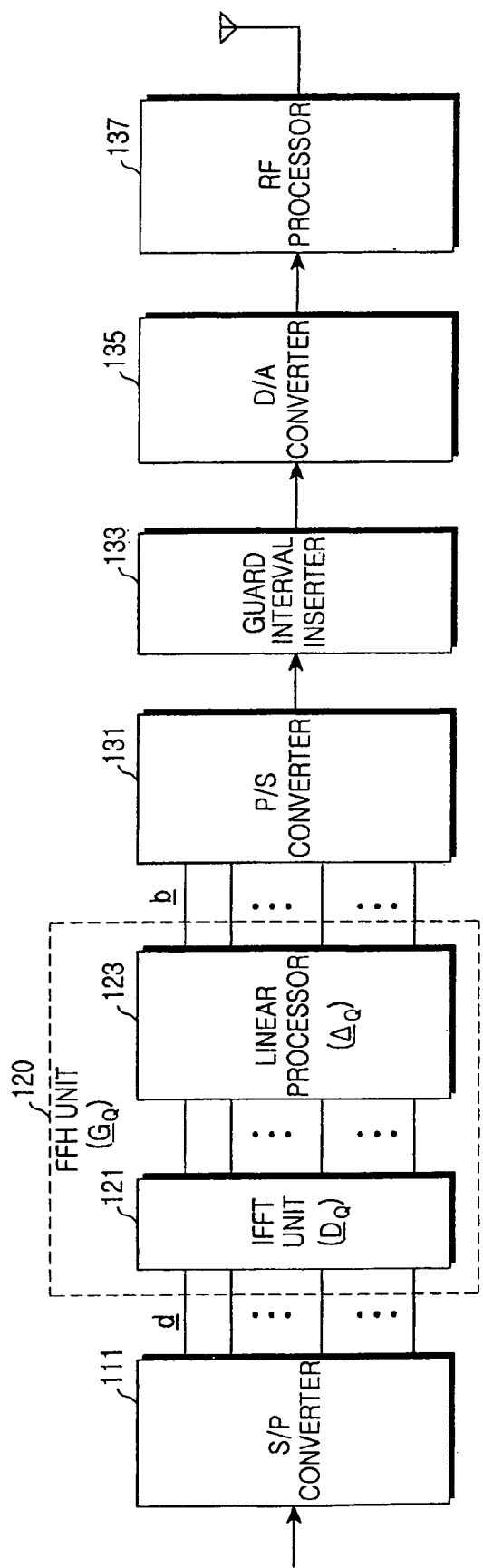
FIG. 1 is a block diagram illustrating a structure of a transmitter of an FFH-OFDM communication system performing a function according to the first exemplary embodiment of the present invention.

FIG. 1 is a block diagram illustrating a structure of a transmitter of an FFH-OFDM communication system performing a function according to the first exemplary embodiment of the present invention.

Referring to FIG. 1, the transmitter includes a serial-to-parallel (S/P) converter 111, a Fast Frequency Hoping (FFH) unit 120, a parallel-to-serial (P/S) converter 131, a guard interval inserter 133, a digital-to-analog (D/A) converter 135, and a Radio Frequency (RF) processor 137. The FFH unit 120 includes an Inverse Fast Fourier Transform (IFFT) unit 121 and a linear processor 123.

When there is an input data to be transmitted, the input data is input to the S/P converter 111. The data includes actual user data or reference data, such as a pilot. The S/P converter 111 converts the input data symbols into parallel signals and outputs the converted parallel signals to the IFFT unit 121. As used herein, the parallel signals output from the SIP converter 111 are named d which is defined by equation (2) below.

$$\underline{d} = [d_1 \ldots d_Q]^T \tag{2}$$

In equation (2), T denotes a transpose operation and Q denotes the total number of available sub-carriers used in the FFH-OFDM communication system.

The IFFT unit 121 performs Q-point IFFT on the signals d output from the S/P converter 111 and outputs the IFFTed signals to the linear processor 123. The linear processor 123 performs linear processing for the signals from the IFFT unit 121 and then outputs the processed signals to the P/S converter 131.

Hereinafter, operations of the IFFT unit 121 and the linear processor 123 will be described in more detail.

When performing fast frequency hopping for the sub-carriers, in order to transmit data at a time interval corresponding to an OFDM sample time period or a multiple of the OFDM sample time period in the transmitter shown in FIG. 1 which uses all of the available frequency bands, the frequency modulation can be expressed by a new matrix $\underline{G}_Q$ having a size of Q×Q. In other words, a matrix for performing frequency modulation according to the fast frequency hopping scheme (hereinafter, referred to as "fast frequency hopping matrix") as defined by equation (3) below is different from the IFFT matrix $\underline{D}_Q$ defined by equation (1) described in the description of the related art. As described above, the IFFT matrix $\underline{D}_Q$ is a matrix corresponding to the frequency modulation operation of the IFFT unit.

$$[G_Q]_{n,m} = \frac{1}{\sqrt{Q}} \left[ \exp\left\{ j2\pi(n-1) \cdot \frac{[\Phi]_{n,m}}{Q} \right\} \right], \tag{3}$$

$$m, n = 1, \ldots, Q$$

In equation (3), n denotes a sample index and m denotes a sub-channel index. Further, $[\Phi]_{n,m}$ denotes a sub-carrier which transmits data of the $m^{th}$ sub-channel at the $n^{th}$ sample. Therefore, $[\Phi]_{n,m}$ determines the fast frequency hopping pattern when performing the fast frequency hopping. Further, an exemplary embodiment of the present invention employs fast frequency hopping patterns which can prevent sub-carriers for data transmission from overlapping at a predetermined sample, and the fast frequency hopping matrix $\underline{G}_Q$ for all fast frequency hopping patterns is expressed by equation (4) below.

$$\underline{G}_Q = \underline{A}_Q \underline{D}_Q, \underline{A}_Q = \underline{G}_Q \underline{D}_Q^H \tag{4}$$

In equation (4), values of elements of the fast frequency hopping matrix $\underline{G}_Q$ and the matrix $\underline{A}_Q$ are predetermined according to the fast frequency hopping patterns, and the matrix $\underline{A}_Q$ has a size of Q×Q.

On an assumption that $f_n$ of the fast frequency hopping patterns is a sub-carrier which transmits data of the first sub-channel at the $n^{th}$ sample, the matrix $\underline{A}_Q$ of equation (4) always becomes a diagonal matrix when it is generated by using a cyclic fast frequency hopping pattern defined by equation (5) below.

$$[\Phi]_{n,m} = \mod(f_n + m - 1, Q), \tag{5}$$

$$m = 1, \ldots, Q$$

In this case, the fast frequency hopping matrix $\underline{G}_Q$ is expressed as a product obtained by multiplying the general IFFT matrix $\underline{D}_Q$ by the matrix $\underline{A}_Q$. Therefore, a device for performing the fast frequency hopping can be implemented by the IFFT unit and the linear processor which can multiply the IFFT matrix by the matrix $\underline{A}_Q$. As described herein, an exemplary embodiment of the present invention is based on an assumption that the fast frequency hopping pattern is an example of the cyclic fast frequency hopping pattern. Therefore, the matrix $\underline{\Delta}_Q$ is also defined as a diagonal matrix. It goes without saying that the type of fast frequency hopping pattern can be modified.

As used herein, the signals output from the linear processor 123 are named $\underline{b}$. The signals $\underline{b}$ are defined by equation (6) below.

$$\underline{b} = \underline{G}_Q \underline{d} = \underline{\Delta}_Q \underline{D}_Q \underline{d} \tag{6}$$

The P/S converter 131 receives the signals b from the linear processor 123, converts the signals b into a serial signal, and then outputs the converted serial signal to the guard interval inserter 133. The guard interval inserter 133 inserts a guard interval into the signal output from the P/S converter 131, and then outputs the signal to the D/A converter 135. The guard interval is inserted to remove interference between a previous OFDM symbol transmitted at a previous OFDM symbol time and a current OFDM symbol to be transmitted at a current OFDM symbol time in an OFDM communication system. Further, a cyclic prefix method or a cyclic postfix method is used in order to insert the guard interval. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol.

The D/A converter 135 converts the signal output from the guard interval inserter 133 into an analog signal and then outputs the converted signal to the RF processor 137. The RF processor 137 includes elements such as a filter and a front end unit. The RF processor 137 RF-processes the signal output from the D/A converter 135 and transmits the processed signal through an actual channel.

Hereinafter, a structure of a receiver of an FFH-OFDM communication system performing a function according to the first exemplary embodiment of the present invention will be described with reference to FIG. 2.

Figure 2:
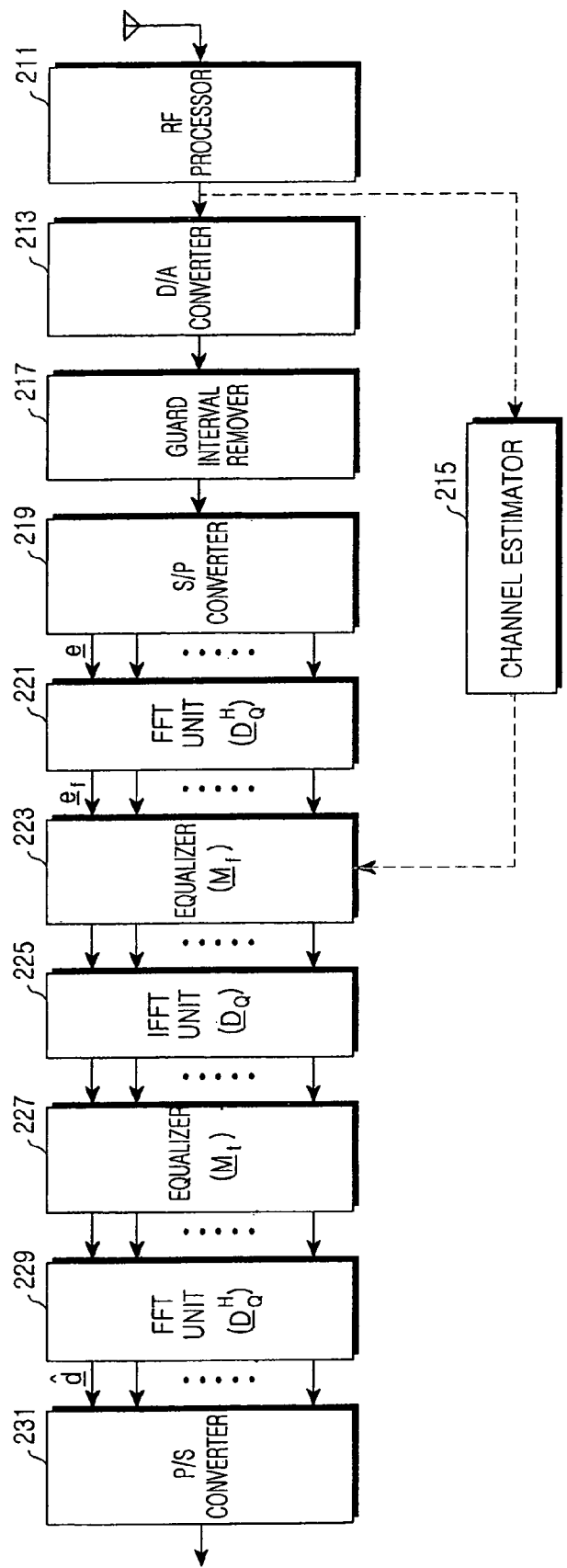
FIG. 2 is a block diagram illustrating a structure of a receiver of an FFH-OFDM communication system performing a function according to the first exemplary embodiment of the present invention.

FIG. 2 is a block diagram illustrating a structure of a receiver of an FFH-OFDM communication system performing a function according to the first exemplary embodiment of the present invention.

The receiver shown in FIG. 2 includes an RF processor 211, a D/A converter 213, a channel estimator 215, a guard interval remover 217, an S/P converter 219, an FFT unit 221, an equalizer 223, an IFFT unit 225, an equalizer 227, an FFT unit 229, and a parallel-to-serial (P/S) converter 231.

A signal transmitted from the transmitter of the FFH-OFDM communication system shown in FIG. 1 picks up noise such as Additive White Gaussian Noise (AWGN) while passing through a multipath channel, and the signal with added noise is then input to the RF processor 211 through an antenna. As used herein, a channel matrix representing a channel response of the multipath channel is denoted as $\underline{H}_t$ and the added noise is denoted as $\underline{n}_t$, wherein t implies that the channel response and noise are measured in a time domain. The RF processor 211 down-converts the signal received through the antenna into an Intermediate Frequency (IF) signal and then a base band frequency signal and then outputs the converted signal to the D/A converter 213. The D/A converter 213 converts the analog signal output from the RF processor 211 into a digital signal, and then outputs the converted digital signal to the channel estimator 215 and the guard interval remover 217.

The channel estimator 215 performs channel estimation for the signal from the D/A converter 213, and outputs the result of the channel estimation to the equalizer 223. The operation of channel estimation by the channel estimator 215 has no direct relation to the exemplary embodiments of the present invention and will not be described in more detail. The guard interval remover 217 removes a guard interval from the signal input from the D/A converter 213, and outputs the resulting signal to the S/P converter 219. The S/P converter 219 converts the signal from the guard interval remover 217 into parallel signals and outputs the converted parallel signals to the FFT unit 221. As used herein, the signals output from the S/P converter 219 are named e. The signals e are time domain signals and are defined by equation (7) below.

$$\underline{e} = \underline{H}_t \underline{b} + \underline{n}_t \tag{7}$$

The FFT unit 221 performs a Q-point FFT on the signals e from the S/P converter 219 and then outputs the signals to the equalizer 223. As used herein, the signals output from the FFT unit 221 are named $\underline{e}_f$. The signals $\underline{e}_f$ are frequency domain signals and are defined by equation (8) below.

$$\underline{e}_f = \underline{D}_Q^H \underline{e} = \underline{D}_Q^H \underline{H}_t \underline{b} + \underline{n}_f \tag{8}$$

In equation (8), $\underline{D}_Q^H$ denotes a Hermitian of the IFFT matrix $\underline{D}_Q$.

In order to compensate for signal distortion by the multipath channel, it is necessary to perform an equalizing operation. Especially, in the FFH-OFDM communication system, it is necessary to perform the equalization both in the time domain and in the frequency domain. Therefore, the FFH-OFDM communication system requires two equalizers including a time domain equalizer for equalizing a time domain signal and a frequency domain equalizer for equalizing a frequency domain signal.

Therefore, the equalizer 223 equalizes the signals from the FFT unit 221 in the frequency domain and then outputs them to the IFFT unit 225. The equalizer 223 compensates for the channel response of the frequency domain. Since the FFH-OFDM communication system uses a guard interval signal, the channel response in the time domain and the channel response in the frequency domain are in a relation of Singular Value Decomposition, which can be defined by equation (9) below.

$$\underline{H}_f = \underline{D}_Q^H \underline{H}_t \underline{D}_Q \tag{9}$$

In equation (9), $\underline{H}_f$ denotes a channel matrix which represents a channel response in the frequency domain. Since the channel matrix $\underline{H}_f$ is a diagonal matrix, it can be implemented by a single tap equalizer. The equalizer 223 for performing equalization of the frequency domain performs substantially the same operation as that of the equalizer of a typical OFDM communication system. The equalizer 223 has a structure including a Zero Forcing (ZF) equalizer, a Minimum Mean Square Error (MMSE) equalizer, and a matching filter, according to the channel compensation scheme.

Further, the IFFT unit 225 performs a Q-point IFFT on the signals from the equalizer 223 and then outputs the signals to the equalizer 227. The operation of the IFFT unit 225 is the same as that of the IFFT unit 121 of the transmitter shown in FIG. 1, so a detailed description thereof is omitted here.

The equalizer 227 receives the signals from the IFFT unit 225, equalizes the signals in the time domain, and then outputs the signals to the FFT unit 229. As used herein, the equalization of the signals in the time domain is denoted as $\underline{M}_t$. The equalization $\underline{M}_t$ in the time domain can be defined by equation (10) below.

$$\underline{M}_t = \underline{\Delta}_Q^H \tag{10}$$

As noted from equation (10), the equalization $\underline{M}_t$ in the time domain can be expressed by a Hermitian $\underline{\Delta}_Q^H$ of the matrix $\underline{\Delta}_Q$ as defined by equation (4). Therefore, the matrix $\underline{\Delta}_Q^H$ is also a diagonal matrix.

The FFT unit 229 receives the signals from the equalizer 227, performs a Q-point FFT on the signals, and then outputs the signals to the P/S converter 231. The operation of the FFT unit 229 is the same as that of the FFT unit 221, so a detailed description thereof is omitted here. The signals output from the FFT unit 229 can be expressed by an input data symbol estimation vector $\underline{\hat{d}}$, which can be defined by equation (11) below.

$$\underline{\hat{d}} = \underline{D}_Q^H \underline{M}_Q \underline{M}_t \underline{e}_f \quad (11)$$

For example, when the equalizer 223 uses a ZF equalizer classifying channel responses according to sub-carriers for frequency domain signals as defined by equation (8) and the equalizer 227 performs the equalization $M_t$ as defined by equation (10), the input data symbol estimation vector $\underline{\hat{d}}$ as defined by equation (11) can be extended as shown in equation (12) below.

$$\begin{aligned}\underline{\hat{d}} &= D_Q^H \Delta_Q^H D_Q H_f^{-1}(D_Q^H \underline{e} + \underline{n}_f) \\ &= D_Q^H \Delta_Q^H D_Q H_f^{-1} D_Q^H H_t \Delta_Q D_Q \underline{d} + D_Q^H \Delta_Q^H D_Q H_f^{-1} \underline{n}_f \\ &= \underline{d} + D_Q^H \Delta_Q^H D_Q H_f^{-1} \underline{n}_f\end{aligned} \quad (12)$$

The P/S converter 231 converts the signals from the FFT unit 229 into a serial signal and then outputs the serial signal including the final input symbols.

In relation to FIGS. 1 and 2, an FFH-OFDM communication system according to the first exemplary embodiment of the present invention, which performs fast frequency hopping by using all of the available frequency bands, has been described above. Hereinafter, FFH-OFDM communication systems according to the second and third exemplary embodiments of the present invention, which perform fast frequency hopping by using a subset of all of the available frequency bands, will be described.

The second and third exemplary embodiments of the present invention, which reflect fast frequency hopping by using a subset of all of the available frequency bands, are necessary when frequency bands corresponding to specific sub-carriers are not used for signal transmission but are used only as guard bands, or when only a subset of all of the available frequency bands corresponding to specific sub-carriers are allocated to each user for signal transmission. The FFH-OFDM communication system can remarkably improve the system performance by employing a Dynamic channel Allocation (DCA) scheme which dynamically allocates sub-channels based on the channel states of users at each time point. Therefore, the second and third exemplary embodiments of the present invention propose schemes for performing fast frequency hopping by using a subset of all of the available frequency bands. As described in the second and third exemplary embodiments of the present invention, it is assumed that the number of all of the available frequency bands used in the FFH-OFDM communication system is Q and the number of sub-carriers corresponding to the partial frequency bands is M (M≦Q).

Hereinafter, the difference between the second and third exemplary embodiments of the present invention will be briefly described.

First, in the second exemplary embodiment of the present invention, fast frequency hopping is performed only for the M sub-carriers and a null data (e.g. 0) is inserted to the other sub-carriers, that is the (Q-M) sub-carriers. In this embodiment, it is possible to implement an exemplary embodiment of the present invention in the same way as that of the first exemplary embodiment by assuming the frequency bands corresponding to the M sub-carriers to be all of the available frequency bands.

Next, in the third exemplary embodiment of the present invention, data is spread by performing fast frequency hopping for all of the available Q sub-carriers including both the M sub-carriers and the (Q-M) sub-carriers. Null data (e.g. 0) is inserted only into the (Q-M) sub-carriers and not the M sub-carriers. Specifically, in the third exemplary embodiment of the present invention, null data is inserted in advance to the (Q-M) sub-carriers. The fast frequency hopping is performed for the Q sub-carriers. After that, null data is inserted again into the (Q-M) sub-carriers. Finally, the sub-carriers are then transmitted. In order to generate the same transmission signal as that of the second embodiment, the third embodiment must satisfy two conditions, which will be described in detail below.

A structure of a transmitter of an FFH-OFDM communication system performing a function according to the second exemplary embodiment of the present invention will be described with reference to FIG. 3.

Figure 3:
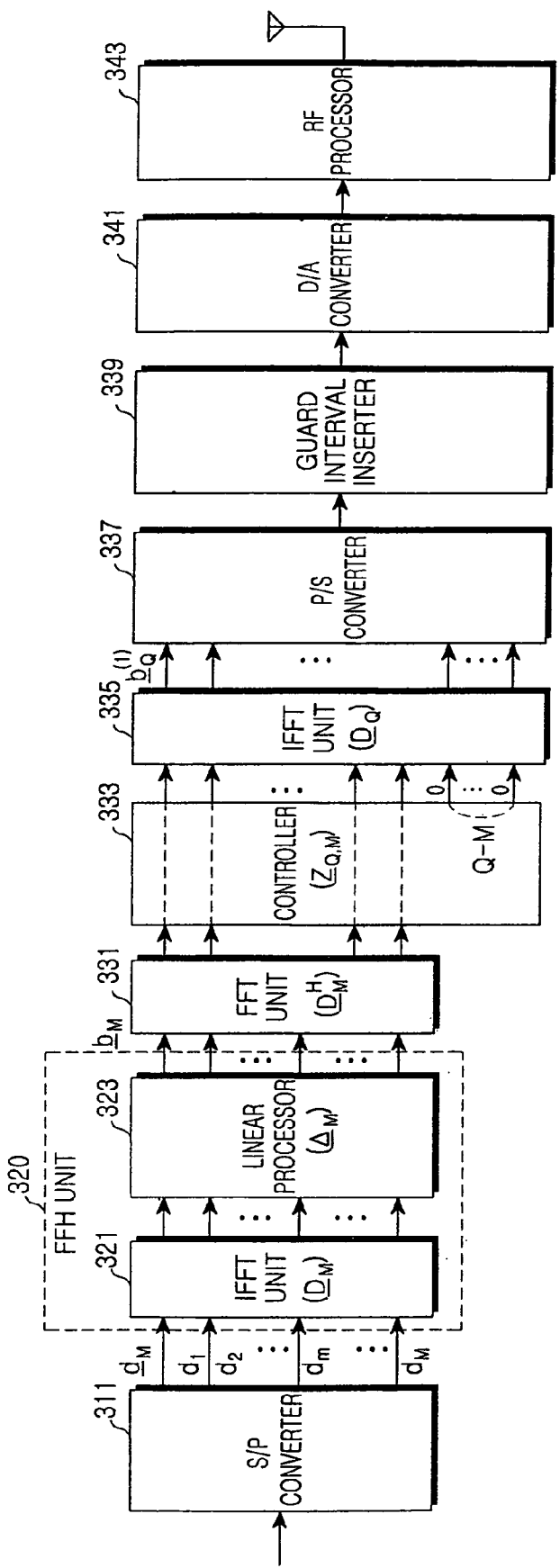
FIG. 3 is a block diagram illustrating a structure of a transmitter of an FFH-OFDM communication system performing a function according to the second exemplary embodiment of the present invention.

FIG. 3 is a block diagram illustrating a structure of a transmitter of an FFH-OFDM communication system performing a function according to the second exemplary embodiment of the present invention.

Referring to FIG. 3, the transmitter includes a serial-to-parallel (S/P) converter 311, an FFH unit 320, a Fast Fourier Transform (FFT) unit 331, a controller 333, an IFFT unit 335, a P/S converter 337, a guard interval inserter 339, a D/A converter 341, and an RF processor 343. The FFH unit 320 includes an IFFT unit 321 and a linear processor 323.

First, when there is input data to be transmitted, the input data is input to the S/P converter 311. The data includes either actual user data or reference data such as a pilot. Since fast frequency hopping is performed only for the M sub-carriers in the second exemplary embodiment of the present invention, the S/P converter 311 converts the input data symbols into M parallel symbols and outputs the converted parallel symbols to the IFFT unit 321. As used herein, the parallel signals output from the S/P converter 311 are named $\underline{d}_M$ which is defined by equation (13) below.

$$\underline{d}_M = [d_1 \ldots d_M]^T \quad (13)$$

The IFFT unit 321 performs an M-point IFFT on the parallel signals $d_M$ output from the S/P converter 311 and outputs the IFFTed signals to the linear processor 323. The linear processor 323 performs linear processing for the signals from the IFFT unit 321 and then outputs the processed signals to the FFT unit 331.

Hereinafter, operations of the IFFT unit 321 and the linear processor 323 will be described in more detail.

The transmitter shown in FIG. 3 uses only the M sub-carriers instead of all of the available frequency bands. Therefore, when performing fast frequency hopping for the sub-carriers in order to transmit data at a time interval corresponding to an OFDM sample time period or a multiple of the OFDM sample time period in the transmitter shown in FIG. 3 which uses only the M sub-carriers instead of all of the available frequency bands, a fast frequency hopping matrix is generated in the same way as that for the fast frequency hopping matrix $G_Q$ according to the first exemplary embodiment of the present invention. However, in the second exemplary embodiment of the present invention, the newly generated matrix is $G_M$ different from $G_Q$ of the first embodiment. The newly generated fast frequency hopping matrix $G_M$ can be defined by equation (14).

$$[G_M]_{n,m} = \frac{1}{\sqrt{M}}\left[\exp\left\{j2\pi(n-1)\cdot\frac{[\Phi]_{n,m}}{M}\right\}\right], \quad (14)$$
$$m, n = 1, \ldots, M$$

In equation (14), the fast frequency hopping matrix $G_M$ has a size of M×M.

Further, the exemplary embodiments of the present invention are based on fast frequency hopping patterns which can prevent sub-carriers for data transmission from overlapping at a predetermined sample, and the fast frequency hopping matrix GM can be expressed by equation (15) below for all the fast frequency hopping patterns.

$$G_M = \Delta_M D_M, \Delta_M = G_M D_M^H \quad (15)$$

In equation (15), values of elements of the fast frequency hopping matrix $G_M$ and the matrix $\Delta_M$ are predetermined according to the fast frequency hopping patterns.

On an assumption that $f_n$ of the fast frequency hopping patterns is a sub-carrier which transmits data of the first sub-channel at the $n^{th}$ sample, the matrix $\Delta_M$ defined by equation (15) always becomes a diagonal matrix when it is generated by using a cyclic fast frequency hopping pattern defined by equation (16) below.

$$[\Phi]_{n,m} = \mathrm{mod}(f_n + m - 1, M), m = 1, \ldots M \quad (16)$$

In this case, the fast frequency hopping matrix $G_M$ is expressed as a product obtained by multiplying the general IFFT matrix $D_M$ by the matrix $\Delta_M$. Therefore, a device for performing the fast frequency hopping can be implemented by the IFFT unit and the linear processor which can multiply the IFFT matrix by the matrix $\Delta_M$. As described herein, exemplary embodiments of the present invention are based on an assumption that the fast frequency hopping pattern is an example of the cyclic fast frequency hopping pattern. Therefore, the matrix $\Delta_M$ is also defined as a diagonal matrix. It goes without saying that the type of fast frequency hopping pattern can be modified.

As used herein, the signals output from the linear processor 323 are named $b_M$. The signals $b_M$ can be defined by equation (17) below.

$$b_M = G_M d_M = \Delta_M D_M d_M \quad (17)$$

The FFT unit 331 performs an M-point FFT on the signals $b_M$ from the linear processor 323, and then outputs the signals to the controller 333. The controller 333 receives the signals from the FFT unit 331, inserts null data (e.g. 0) to the (Q-M) sub-carrier bands except for the M sub-carrier bands, and then outputs the signals to the IFFT unit 335. In this case, the controller 333 functions as a kind of zero inserter (0 inserter). The zero inserting operation of the controller 333 can be expressed by equation (18) below.

$$Z_{Q,M} = \begin{pmatrix} I_M \\ 0_{Q-M,M} \end{pmatrix} \quad (18)$$

$Z_{Q,M}$ is a matrix for expressing the operation of the controller 333 of FIG. 3. As described above, from among the output signals of the controller 333, the data transmitted by the M sub-carriers are data which have already been subjected to fast frequency hopping, and the null data transmitted by the (Q-M) sub-carriers are data which have never been subjected to fast frequency hopping.

The IFFT unit 335 receives the signals from the controller 333, performs a Q-point IFFT on the signals, and then outputs the signals to the P/S converter 337. As used herein, the signals output from the IFFT unit 335 are named $b_Q^{(1)}$. The signals $b_Q^{(1)}$ can be defined by equation (19) below.

$$b_Q^{(1)} = D_Q Z_{Q,M} D_M^H \Delta_M D_M d_M \quad (19)$$

The P/S converter 337, the guard interval inserter 339, the D/A converter 341, and the RF processor 343 perform the same operations as those of the P/S converter 131, the guard interval inserter 133, the D/A converter 135, and the RF processor 137 shown in FIG. 1, so a detailed description of them will be omitted here.

In relation to FIG. 3, a structure of a transmitter of an FFH-OFDM communication system performing a function according to the second exemplary embodiment of the present invention has been described above. Hereinafter, a structure of a receiver of an FFH-OFDM communication system performing a function according to the second exemplary embodiment of the present invention will be described with reference to FIG. 4.

Figure 4:
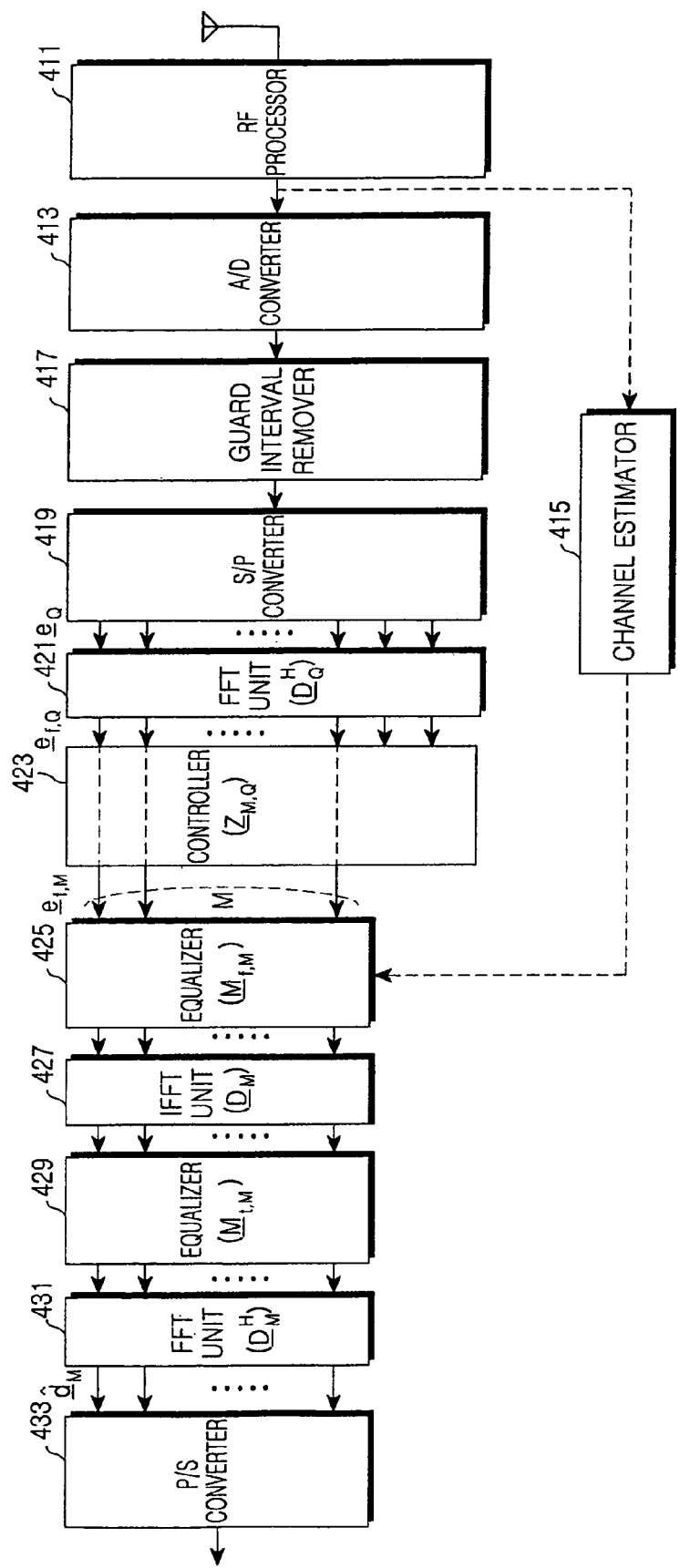
FIG. 4 is a block diagram illustrating a structure of a receiver of an FFH-OFDM communication system performing a function according to the second exemplary embodiment of the present invention.

FIG. 4 is a block diagram illustrating a structure of a receiver of an FFH-OFDM communication system performing a function according to the second exemplary embodiment of the present invention.

The receiver shown in FIG. 4 includes an RF processor 411, a D/A converter 413, a channel estimator 415, a guard interval remover 417, an S/P converter 419, an FFT unit 421, a controller 423, an equalizer 425, an IFFT unit 427, an equalizer 429, an FFT unit 431, and a P/S converter 433. The RF processor 411, the D/A converter 413, the guard interval remover 417, and the S/P converter 419 of FIG. 4 perform the same operations as those of the RF processor 211, the D/A converter 213, the guard interval remover 217, and the S/P converter 219 of FIG. 2, so a detailed description of them will be omitted here.

As used herein, the signals output from the S/P converter 419 are named $e_Q$. The signals $e_Q$ can be defined by equation (20) below.

$$e_Q = H_t b_Q^{(1)} + n_t \quad (20)$$

The FFT unit 421 performs a Q-point FFT on the signals $e_Q$ from the S/P converter 419 and then outputs the signals to the controller 423. As used herein, the signals output from the FFT unit 421 are named $e_{f,Q}$. The signals $e_{f,Q}$ are frequency domain signals and are defined by equation (21) below.

$$e_{f,Q} = D_Q^H e_Q = D_Q^H H_t b_Q^{(1)} + D_Q^H n_f \quad (21)$$

Meanwhile, since only the M sub-carrier signals from among the Q sub-carriers output from the FFT unit 421 include data, the controller 423 eliminates the (Q-M) sub-carrier signals containing null data (e.g. 0) from among the signals $e_{f,Q}$ output from the FFT unit 421, and outputs only the M sub-carriers to the equalizer 425. In this case, the controller 423 functions as a kind of zero remover (0 remover). The controller 423 removes the 0s inserted by the controller 333 of FIG. 3.

The zero removing operation of the controller 423 can be expressed by equation (22) below.

$$Z_{M,Q} = (I_M 0_{M,Q-M}) \quad (22)$$

Meanwhile, in order to compensate for signal distortion by the multipath channel, it is necessary to perform an equalizing operation. In the FFH-OFDM communication system, it is necessary to perform the equalization both in the time domain and in the frequency domain. Therefore, the FFH-OFDM communication system requires two equalizers including a time domain equalizer for equalizing a time domain signal and a frequency domain equalizer for equalizing a frequency domain signal.

Therefore, the equalizer 425 equalizes the signals from the controller 423 in the frequency domain and then outputs them to the IFFT unit 427. The equalizer 425 compensates for the channel response of the frequency domain.

Further, the IFFT unit 427 performs an M-point IFFT on the signals from the equalizer 425 and then outputs the signals to the equalizer 429. The operation of the IFFT unit 427 is the same as that of the IFFT unit 321 of the transmitter shown in FIG. 3, so a detailed description thereof is omitted here.

The equalizer 429 receives the signals from the IFFT unit 427, equalizes the signals in the time domain, and then outputs the signals to the FFT unit 431. As used herein, the equalization of the signals in the time domain is named $\underline{M}_{t,M}$. The equalization $\underline{M}_{t,M}$ in the time domain can be defined by equation (23) below.

$$\underline{M}_{t,M} = \underline{\Delta}_M^H \tag{23}$$

As noted from equation (23), the equalization $\underline{M}_{t,M}$ in the time domain can be expressed by a Hermitian $\underline{\Delta}_M^H$ of the matrix $\underline{\Delta}_M$ as defined by equation (15). Therefore, the matrix $\underline{\Delta}_M^H$ is also a diagonal matrix.

The FFT unit 431 receives the signals from the equalizer 429, performs an M-point FFT on the signals, and then outputs the signals to the P/S converter 433. The operation of the FFT unit 431 is the same as that of the FFT unit 331 of FIG. 3, so a detailed description thereof is omitted here. The signals output from the FFT unit 431 can be expressed by an input data symbol estimation vector $\hat{\underline{d}}$, which can be defined by equation (24) below. Meanwhile, in equation (24), $\underline{e}_{f,Q}$ denotes a signal output from the FFT unit 431, and input to the controller 423, and $\underline{D}_M^H$, $\underline{M}_{t,M}$, $\underline{D}_M$, $\underline{M}_{f,M}$, and $\underline{Z}_{M,Q}$ denote matrixes representing the FFT unit 431, the equalizer 429, the IFFT unit 427, the equalizer 425, and the controller 423, respectively.

$$\hat{\underline{d}}_M = \underline{D}_M^H \underline{M}_{t,M} \underline{D}_M \underline{M}_{f,M} \underline{Z}_{M,Q} \underline{e}_{f,Q} \tag{24}$$

The P/S converter 433 converts the signals from the FFT unit 431 into a serial signal and then outputs the serial signal including final input symbols.

In relation to FIG. 4, a structure of a receiver of an FFH-OFDM communication system performing a function according to the second exemplary embodiment of the present invention has been described above. Hereinafter, a structure of a transmitter of an FFH-OFDM communication system performing a function according to the third exemplary embodiment of the present invention will be described with reference to FIG. 5.

Figure 5:
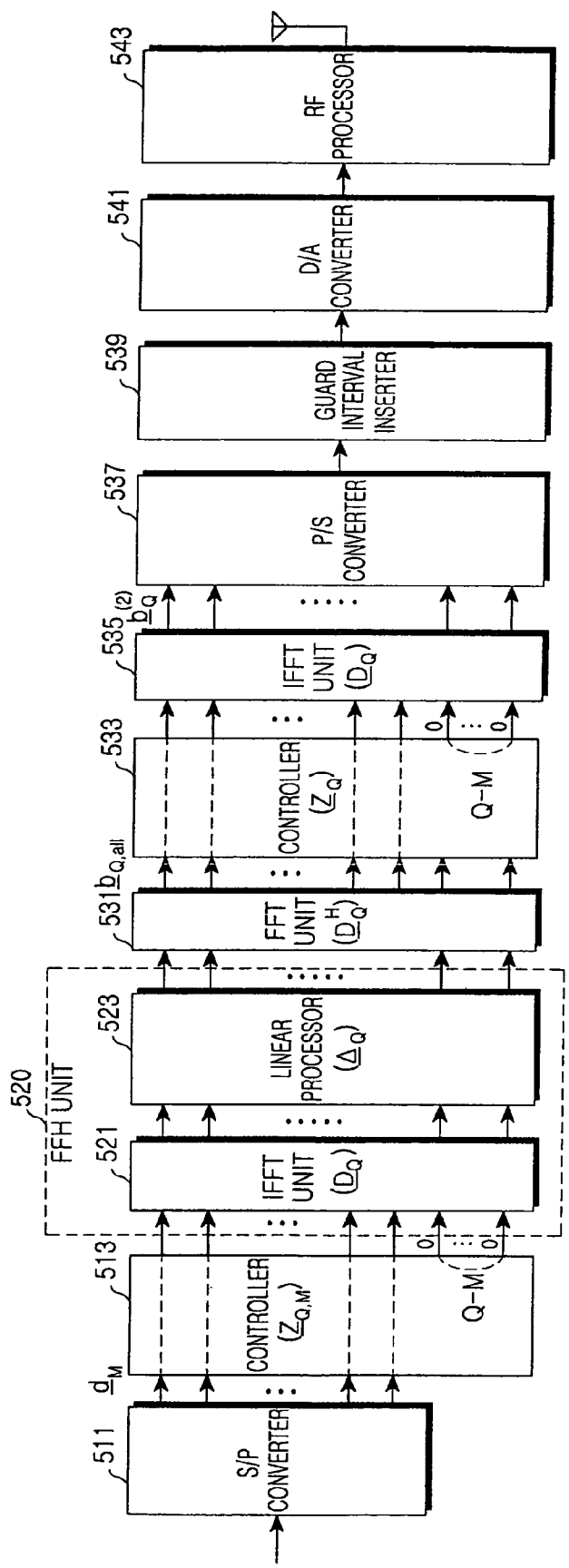
FIG. 5 is a block diagram illustrating a structure of a transmitter of an FFH-OFDM communication system performing a function according to the third exemplary embodiment of the present invention.

FIG. 5 is a block diagram illustrating a structure of a transmitter of an FFH-OFDM communication system performing a function according to the third exemplary embodiment of the present invention.

Referring to FIG. 5, the transmitter includes a serial-to-parallel (S/P) converter 511, a controller 513, an FFH unit 520, an FFT unit 531, a controller 533, an IFFT unit 535, a P/S converter 537, a guard interval inserter 539, a D/A converter 541, and an RF processor 543. The FFH unit 520 includes an IFFT unit 521 and a linear processor 523.

When there is input data to be transmitted, the input data is input to the S/P converter 511. The data includes actual user data or reference data, such as a pilot. Since the fast frequency hopping is performed only for the M sub-carriers in the third exemplary embodiment of the present invention, the S/P converter 511 converts the input data symbols into M parallel symbols and outputs the converted parallel symbols to the controller 513. The controller 513 receives the signals from the S/P converter 511, inserts null data (e.g. 0) to the (Q-M) sub-carrier bands except for the M sub-carrier bands, and then outputs the signals to the IFFT unit 521. In this case, the controller 513 functions as a kind of zero inserter (0 inserter).

The IFFT unit 521 performs a Q-point IFFT on the parallel signals output from the controller 513 and outputs the IFFTed signals to the linear processor 523. The linear processor 523 performs linear processing for the signals from the IFFT unit 521 and then outputs the processed signals to the FFT unit 531. The operations of the IFFT unit 521 and the linear processor 523 are the same as those of the IFFT unit 121 and the linear processor 123 of FIG. 1, so a detailed description thereof will be omitted here.

The FFT unit 531 performs a Q-point FFT on the signals from the FFH unit 520, and then outputs the signals to the controller 533. As used herein, the signals output from the FFT unit 531 are named $\underline{b}_{Q,all}$. The signals $\underline{b}_{Q,all}$ are signals obtained when the M sub-carrier signals containing actual data and the (Q-M) sub-carrier signals containing null data are spread in the time domain.

The controller 533 receives the signals $\underline{b}_{Q,all}$ from the FFT unit 531, inserts null data (e.g. 0) to the (Q-M) sub-carrier bands, and then outputs the signals to the IFFT unit 535. In this case, the controller 533 functions as a kind of zero inserter (0 inserter). The zero inserting operation of the controller 533 can be expressed by equation (25) below.

$$\underline{Z}_Q = \underline{Z}_{Q,M} \underline{Z}_{Q,M}^T = \begin{pmatrix} I_M & 0_{Q-M,M} \\ 0_{Q-M,M} & 0_{Q-M,Q-M} \end{pmatrix} \tag{25}$$

The IFFT unit 535 receives the signals from the controller 533, performs a Q-point IFFT on the signals, and then outputs the signals to the P/S converter 537. As used herein, the signals output from the IFFT unit 535 are named $\underline{b}_Q^{(2)}$. The signals $\underline{b}_Q^{(2)}$ can be defined by equation (26) below. In equation (26) below, $\underline{d}_M$ denotes a data vector input to the controller 513, $\underline{Z}_{Q,M}$, $\underline{D}_Q$, $\underline{\Delta}_Q$, $\underline{D}_Q^H$, $\underline{Z}_Q$, and $\underline{D}_Q$, denote matrixes representing the controller 513, the IFFT unit 521, the linear processor 523, the FFT unit 531, the controller 533, and the IFFT unit 535, respectively.

$$\underline{b}_Q^{(2)} = \underline{D}_Q \underline{Z}_Q \underline{D}_Q^H \underline{\Delta}_Q \underline{D}_Q \underline{Z}_{Q,M} \underline{d}_M \tag{26}$$

As noted from equation (26), by performing fast frequency hopping after generating signals having a size of Q by adding the M sub-carrier signals transmitting actual data and the (Q-M) sub-carrier signals transmitting null data, it is possible to fix the number of the sub-carriers used in each element of the transmitter, thereby achieving a stable hardware construction of the transmitter regardless of the number M of the sub-carriers which actually transmit data.

Meanwhile, the transmission vector $\underline{b}_Q^{(1)}$ as defined by equation (19) and the transmission vector $\underline{b}_Q^{(2)}$ as defined by equation (26) must satisfy two conditions as follows:
(1) 1$^{st}$ Condition In order to make the transmission vector $\underline{b}_{(Q)}^{(1)}$ and the transmission vector $\underline{b}_Q^{(2)}$ have the same format, it is necessary to set the value of the elements of $\underline{\Delta}_Q$ based on the value of the elements of $\underline{\Delta}_M$. The first condition can be expressed by equation (27) below.

$$[\underline{\delta}_{Q,F}]_q = \frac{\sqrt{Q}}{M} \begin{cases} [\underline{Q}_{M,F}]_q & \text{for } q = 1, \ldots, M \\ \text{anything} & \text{for } q = (M+1), \ldots, (Q-M+1) \\ [\underline{Q}_{M,F}]_{q-(Q-M)} & \text{for } q = (Q-M+2), \ldots, Q \end{cases} \quad (27)$$

provided $\underline{\delta}_{Q,F} = D_Q^H diag(\underline{\Delta}_Q)$, $\underline{\delta}_{Q,F} = D_M^H diag(\underline{\Delta}_M)$ As described above, in the third exemplary embodiment of the present invention, since the signals transmitted by the (Q-M) sub-carriers are replaced by null data, multiplication by $$\frac{\sqrt{Q}}{\sqrt{M}}$$

is necessary in equation (27) in order to make the third embodiment have the same amount of total energy as that of the second embodiment.

(2) 2$^{nd}$ Condition

The second condition is a condition to enable the transmission vectors, according to the second exemplary embodiment and the third exemplary embodiment, to always have the same value. The second condition can be expressed by equation (28) below.

$$Q \geq 2M-1 \quad (28)$$

The P/S converter 537, the guard interval inserter 539, the D/A converter 541, and the RF processor 543 performs the same operations as those of the P/S converter 131, the guard interval inserter 133, the D/A converter 135, and the RF processor 137 of FIG. 1, so a detailed description thereof will be omitted here.

In relation to FIG. 5, a structure of a transmitter of an FFH-OFDM communication system performing a function according to the third exemplary embodiment of the present invention has been described above. Hereinafter, a structure of a receiver of an FFH-OFDM communication system performing a function according to the third exemplary embodiment of the present invention will be described with reference to FIG. 6.

Figure 6:
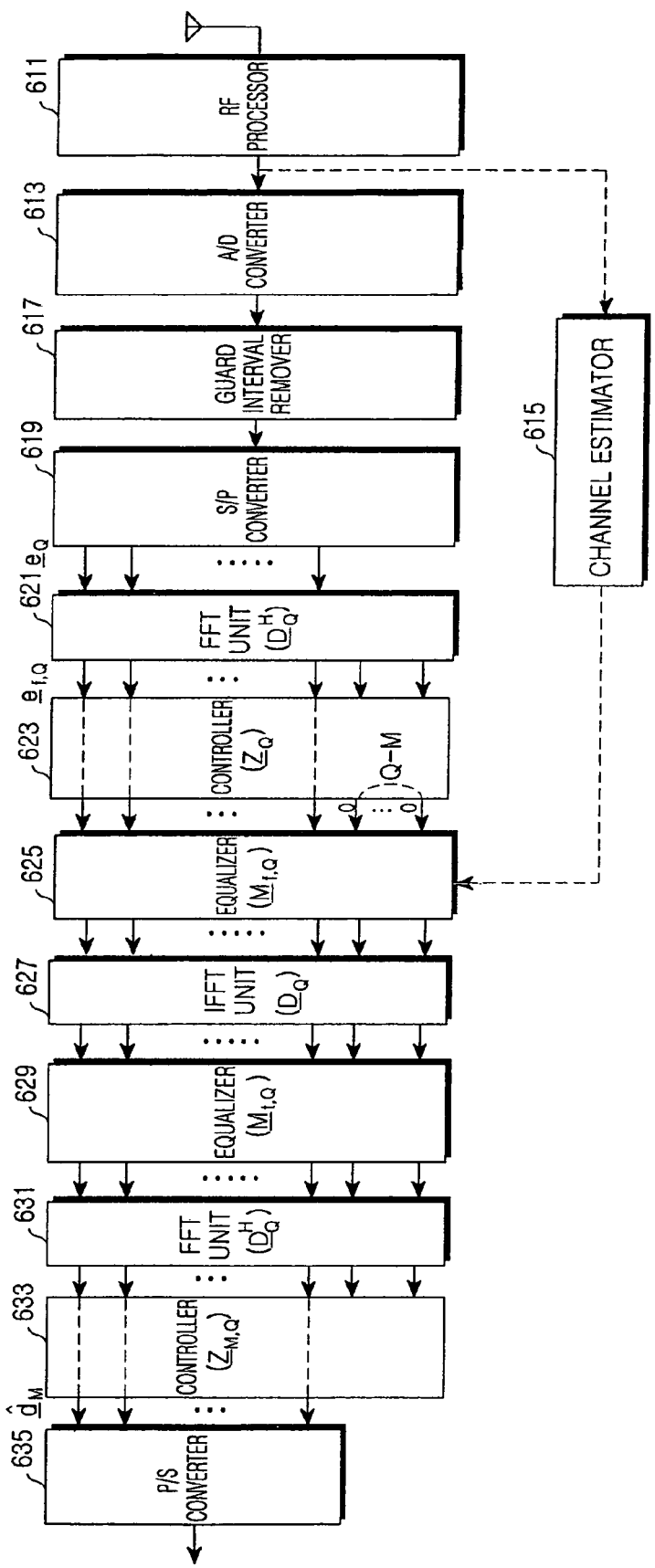
FIG. 6 is a block diagram illustrating a structure of a receiver of an FFH-OFDM communication system performing a function according to the third exemplary embodiment of the present invention.

FIG. 6 is a block diagram illustrating a structure of a receiver of an FFH-OFDM communication system performing a function according to the third exemplary embodiment of the present invention.

The receiver shown in FIG. 6 includes an RF processor 611, a D/A converter 613, a channel estimator 615, a guard interval remover 617, an S/P converter 619, an FFT unit 621, a controller 623, an equalizer 625, an IFFT unit 627, an equalizer 629, an FFT unit 631, a controller 633, and a P/S converter 635. The RF processor 611, the D/A converter 613, the guard interval remover 617, and the S/P converter 619 of FIG. 6 perform the same operations as those of the RF processor 211, the D/A converter 213, the guard interval remover 217, and the S/P converter 219 of FIG. 2, so a detailed description of them will be omitted here. Further, the FFT unit 621 performs the same operation as that of the FFT unit 421 of FIG. 4, so a detailed description thereof will be omitted here.

The signals $\underline{e}_Q$ input to the FFT unit 621 and the signals $\underline{e}_{f,Q}$ output from the FFT unit 621 are the same as the signals $\underline{e}_Q$ and $\underline{e}_{f,Q}$ defined by equations (20) and (21). Further, since the number of sub-carrier signals transmitting actual data in the transmitter of FIG. 5 is M, the M sub-carrier signals contain actual data and the (Q-M) sub-carrier signals contain only noise in the frequency domain signal $\underline{e}_{f,Q}$. Therefore, the controller 623 inserts null data (e.g. 0) to the (Q-M) sub-carrier signals from among the signals $\underline{e}_{f,Q}$ output from the FFT unit 621, and then outputs both the M sub-carrier signals and the (Q-M) sub-carrier signals to the equalizer 625. In this case, the controller 623 functions as a kind of zero inserter (0 inserter).

The equalizer 625 equalizes the signals from the controller 623 in the frequency domain and then outputs them to the IFFT unit 627. The IFFT unit 627 performs a Q-point IFFT on the signals from the equalizer 625 and then outputs the signals to the equalizer 629. The equalizer 629 receives the signals from the IFFT unit 627, equalizes the signals in the time domain, and then outputs the signals to the FFT unit 631. As used herein, a matrix for the equalizer 629 is defined as a Hermitian of the matrix $M_{Q,M}$ of the linear processor 523 of the transmitter of FIG. 5 and can be expressed by equation (29) below.

$$\underline{M}_{t,Q} = \underline{\Delta}_Q^H \quad (29)$$

The FFT unit 631 receives the signals from the equalizer 629, performs a Q-point FFT on the signals, and then outputs the signals to the controller 633. In the signals output from the FFT unit 631, the number of sub-carriers carrying actual data is M, the controller 633 selects and outputs only the signals corresponding to M number of estimation data as shown by equation (30) below. The controller 633 functions as a kind of selector.

$$\underline{d}_M = \underline{Z}_{M,Q} \underline{D}_Q^H \underline{M}_{t,Q} \underline{D}_Q \underline{M}_{f,Q} \underline{Z}_Q \underline{e}_{f,Q} \quad (30)$$

The P/S converter 635 converts the signals from the controller 633 into a serial signal and then outputs the serial signal including final input symbols.

As described above, the transmission vectors transmitted by the transmitters according to the second and third exemplary embodiments of the present invention are the same. Therefore, either the receiver according to the third exemplary embodiment of the present invention may be used together with the transmitter according to the second exemplary embodiment of the present invention, or the receiver according to the second exemplary embodiment of the present invention may be used together with the transmitter according to the third exemplary embodiment of the present invention.

The above description about the second and third exemplary embodiments of the present invention discusses only the case where fast frequency hopping is performed for data transmission targeting only one user. However, when all of the available frequency bands are divided and allocated to a plurality of users in a downlink as in an OFDM communication system, the transmitters and receivers according to the second and third exemplary embodiments of the present invention, performing fast frequency hopping using a subset of all of the available frequency bands may be necessary for each of the plurality of users. The fourth exemplary embodiment of the present invention proposes a scheme for fast frequency hopping in consideration of multiple users, i.e. multiple access.

Hereinafter, an OFDM communication system for performing fast frequency hopping in consideration of multiple users (hereinafter, referred to as "fast frequency hopping OFDM communication system") will be described with reference to FIG. 7.

Figure 7:
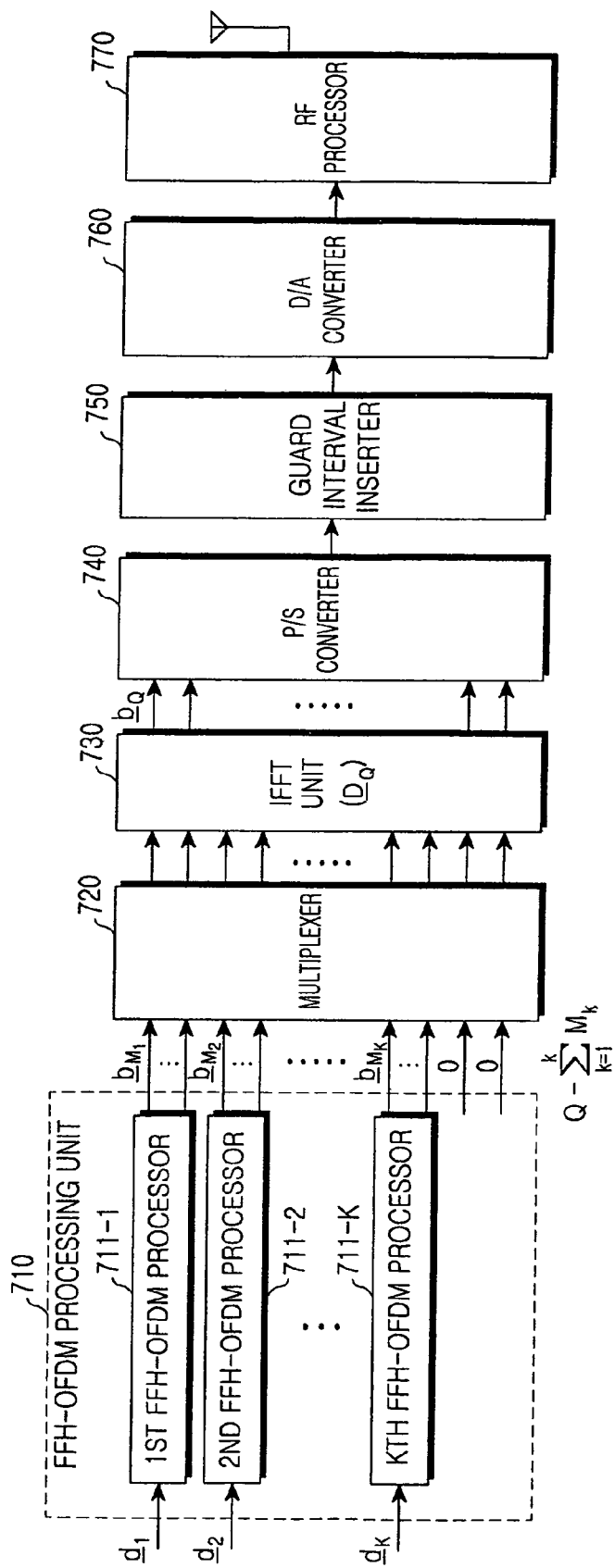
FIG. 7 is a block diagram illustrating a structure of a transmitter in a fast frequency hopping OFDM communication system, which performs a function according to the fourth exemplary embodiment of the present invention.

FIG. 7 is a block diagram illustrating a structure of a transmitter in a fast frequency hopping OFDM communication system, which performs a function according to the fourth exemplary embodiment of the present invention.

The transmitter show in FIG. 7 includes a Fast Frequency Hopping-OFDM (FFH-OFDM) processing unit 710, a multiplexer 720, an IFFT unit 730, a P/S converter 740, a guard interval inserter 750, a D/A converter 760, and an RF processor 770. The FFH-OFDM processing unit 710 includes a plurality of FFH-OFDM processors including a first FFH-OFDM processor 711-1 processing data targeting the first user through a $K^{th}$ FFH-OFDM processor 711-K processing data targeting the $K^{th}$ user. A second FFH-OFDM processor 711-2 processing data targeting the second user is shown for exemplary purposes only.

It is assumed that the number of sub-carriers to be allocated to the first user through the $K^{th}$ user are $M_1$ through $M_K$, respectively, and the data to be transmitted to the first user through the $K^{th}$ user are $d_1$ through $d_K$, respectively. The data $d_1$ is input to the first FFH-OFDM processor 711-1, the data d is input to the $K^{th}$ FFH-OFDM processor 711-K, and other data is input to the corresponding FFH-OFDM processors in the same way.

The first FFH-OFDM processor 711-1 through the $K^{th}$ FFH-OFDM processor 711-K perform fast frequency hopping and OFDM modulation in the same manner as described in the second or third exemplary embodiment of the present invention, and then outputs the modulation signals $b_{M1}$ through $b_{MK}$. For example, when the $K^{th}$ FFH-OFDM processor 711-K performs fast frequency hopping and OFDM modulation in the same way as in the second exemplary embodiment of the present invention, an $M_K$ number of elements, which are actually used sub-carriers from among the signals output from the controller 333 of FIG. 3, correspond to $b_{MK}$. In contrast, when the $K^{th}$ FFH-OFDM processor 711-K performs fast frequency hopping and OFDM modulation in the same way as in the third exemplary embodiment of the present invention, an $M_K$ number of elements, which are actually used sub-carriers from among the signals output from the controller 533 of FIG. 5, correspond to $b_{MK}$.

The signals $b_{M1}$ through $b_{MK}$ output from the first FFH-OFDM processor 711-1 through the $K^{th}$ FFH-OFDM processor 711-K are input to the multiplexer 720. The multiplexer 720 inserts 0 to sub-carrier signals corresponding to $$Q - \sum_{k=1}^{K} M_k$$

which have not been allocated to any user, and then outputs the signals to the IFFT unit 730. The IFFT unit 730 performs a Q-point IFFT on the signals from the multiplexer 720 and then outputs the signals to the P/S converter 740. The P/S converter 740, the guard interval inserter 750, the D/A converter 760, and the RF processor 770 perform the same operations as those of the P/S converter 131, the guard interval inserter 133, the D/A converter 135, and the RF processor 137 of FIG. 1, so a detailed description thereof will be omitted here. Although the transmitter of FIG. 7 performs multiplexing of the signals for multiple users, it is possible for the receiver to demodulate its own signal. Therefore, the receiver according to the second or third exemplary embodiment of the present invention may also be used in the present embodiment, without a separate receiver corresponding to the transmitter of FIG. 7.

As described above, the exemplary embodiments of the present invention can achieve fast frequency hopping in an OFDM communication system and acquisition of frequency diversity gain within one OFDM symbol time period, thereby improving system performance. Further, the exemplary embodiments of the present invention enable the fast frequency hopping to be applied not only to all of the available frequency bands of the OFDM communication system but also to a subset of all of the available frequency bands, so that it is possible to perform the fast frequency hopping in the case of employing the DCA scheme or using the guard bands in the OFDM communication system, thereby improving system performance.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for signal transmission in a communication system, the apparatus comprising:
   a Fast Fourier Transform (FFT) unit for performing M-point FFT on input data; and
   an Inverse Fast Fourier Transform (IFFT) unit for performing N-point IFFT on the M-point FFTed data;
   wherein frequency hopping is performed for the M-point FFTed data and the M-point FFTed data are mapped to consecutive input points of the IFFT unit;
   wherein the consecutive input points are determined by the frequency hopping.

2. The apparatus as claimed in claim 1, further comprises:
   a parallel to serial converter for converting the N-point IFFTed data into serial data;
   a guard interval inserter for inserting a guard interval into the serial data; and
   a Radio Frequency(RF) processor for performing RF processing of the data inserted guard interval and for transmitting the RF processed data.

3. A method for signal transmission by signal transmitter in a communication system, the method comprising the steps of:
   performing M-point Fast Fourier Transform (FFT) on input data; and
   performing N-point Inverse Fast Fourier Transform (IFFT) on the M-point FFTed data;
   wherein frequency hopping is performed for the M-point FFTed data and the M-point FFTed data are mapped to consecutive input points of the IFFT;
   wherein the consecutive input points are determined by the frequency hopping.

4. The method as claimed in claim 3, further comprises the steps of:
   converting the N-point IFFTed data into serial data; and
   performing Radio Frequency(RF) processing of the data inserted guard interval and transmitting the RF processed data.

5. An apparatus for signal reception in a communication system, the apparatus comprising:
   a first Fast Fourier Transform (FFT) unit for performing N-point FFT on input data; and
   an Inverse Fast Fourier Transform (IFFT) unit for performing M-point IFFT on the N-point FFTed data;
   wherein frequency hopping is performed for the N-point FFTed data inputted to the IFFT unit and the N-point FFTed data are mapped to consecutive input points;
   wherein the consecutive input points are determined by the frequency hopping.

6. The apparatus as claimed in claim 5, further comprises:
   a Radio Frequency(RF) processor for down-converting received signals into an Intermediate Frequency(IF) signal;

a guard interval remover for removing a guard interval from the down-converted signals; and a serial to parallel converter for converting the signals removed the guard interval into parallel signals to generate the input data.

7. A method for signal reception by signal receiver in a communication system, the method comprising the steps of:

performing N-point Fast Fourier Transform (FFT) on input data; and performing M-point Inverse Fast Fourier Transform (IFFT) on the N-point FFTed data;

wherein frequency hopping is performed for the N-point FFTed data inputted to the IFFT unit and the N-point FFTed data are mapped to consecutive input points of the IFFT;

wherein the consecutive input points are determined by the frequency hopping.

8. The method as claimed in claim 7, further comprises the steps of:

down-converting received signals into an Intermediate Frequency(IF) signal;

removing a guard interval from the down-converted signals; and converting the signals removed the guard interval into parallel signals to generate the input data.

* * * * *